United States Patent [19]

Smits et al.

[11] Patent Number: 5,071,710

[45] **Date of Patent: * Dec. 10, 1991**

[54] PACKAGING FILM WITH A TRANSPARENT BARRIER COATING

[75] Inventors: Paul Smits; Aron M. Rosenfeld, both of Kingston, Canada; Howard F. DeFerrari, Louisville, Ky.

[73] Assignee: Alcan International Limited, Montreal, Canada

[ * ] Notice: The portion of the term of this patent subsequent to Jun. 6, 2006 has been disclaimed.

[21] Appl. No.: 546,045

[22] Filed: Jun. 28, 1990

Related U.S. Application Data

[62] Division of Ser. No. 306,515, Feb. 3, 1989.

[51] Int. Cl.⁵ .............................................. B32B 15/08

[52] U.S. Cl. .................................... 428/469; 156/150; 428/43

[58] Field of Search ................... 428/469, 40, 457, 43; 350/96.12; 156/150

[56] References Cited

U.S. PATENT DOCUMENTS

| | | | |
|---|---|---|---|
| 4,190,315 | 2/1980 | Brettle et al. . | |
| 4,702,963 | 10/1987 | Phillips et al. | 428/469 X |
| 4,837,061 | 6/1989 | Smits et al. | 428/40 |

*Primary Examiner*—Thomas J. Herbert

*Attorney, Agent, or Firm*—Cooper & Dunham

[57] ABSTRACT

A process for coating a packaging film with a transparent barrier coating. The process starts with a metal substrate made of, or having a surface coating of, a valve metal or valve metal alloy. The metal substrate is anodized to form an anodic film of the valve metal on the metal substrate. The anodic film is made readily detachable from the metal by carrying out the anodization step in the presence of an adhesion-reducing agent, e.g. a fluoride. The packaging film is then attached to the anodic film and the anodic film is detached from the metal. The transferred anodic film forms a thin dense oxide coating on the packaging film that acts as a barrier against oxygen and moisture transparent. The invention can be used for making packaging films suitable for packaging foodstuffs, and the like.

2 Claims, 4 Drawing Sheets

PACKAGING FILM WITH A TRANSPARENT BARRIER COATING

This is a division of application Ser. No. 306,515 filed Feb. 3, 1989, now pending.

BACKGROUND OF THE INVENTION

I. Field of the Invention

This invention relates to the formation of a transparent barrier coating on a packaging film, particularly a plastic packaging film, and to the resulting coated film and apparatus for producing the coated film.

II. Description of the Prior Art

Plastic packaging films used in the food industry are normally made moisture and oxygen impermeable by coating the plastic film on one side with a relatively thick layer of aluminum. The resulting film is opaque, so that food contents cannot be seen, and the films cannot be used in microwave ovens because of shorting and reflections caused by the metal layer.

There is a need for transparent, microwavable packaging films having the required barrier properties. While multi-layer plastic film laminates can be used to reduce oxygen and water vapour transmission characteristics of packaging films, satisfactory structures are very expensive and often require as many as six different plastic film layers (see Modern Plastics, August 1986, pp 54–56).

In recent years, a different approach has consisted of vacuum depositing thin films of inorganic coatings onto flexible transparent polymer laminates (see, for example, U.S. Pat. No. 4,702,963 issued on Oct. 27, 1987 to Optical Coating Laboratory Inc. and Japanese Patent Application 60 46,363). A recent article in Paper, Film and Foil Converter, June 1988, pp 102–104, describes the deposition of transparent silica barrier coatings on plastic films via electron beam technology. It is apparent that complex and expensive equipment has to be utilized to deposit such barrier coatings onto plastic substrates and that the resulting coatings may be subject to cracking upon flexing of the film. Furthermore, the silica type films used in the process exhibit a yellowish colouration when laminated with transparent flexible polymer films for use in packaging, and this colouration makes many food contents look unappealing. Finally, materials deposited by electron beam techniques are typically less dense than the bulk form of the coating material and so the barrier properties are not optimal.

Non-porous oxide films produced on certain valve metals by anodization are denser than similar materials deposited by electron beam techniques or other types of deposition. However, while such non-porous, dense anodic oxide films make excellent candidates for use in transparent vapour barrier/polymer composites, such films cannot be easily separated over large areas from the metal on which they are formed. Dissolution of the underlying metal base by chemical means would be a possible approach, but would be highly uneconomical and cumbersome and would be difficult to achieve without the oxides themselves being subject to inadvertent dissolution by such means.

OBJECTS OF THE INVENTION

An object of the invention is to provide a method of transferring an anodic oxide coating to a packaging film.

Another object of the invention is to provide a packaging material with a transparent dense anodic oxide coating capable of acting as an oxygen and moisture barrier.

Yet another object of the invention is to provide a packing film with a dense coating of a valve metal oxide.

SUMMARY OF THE INVENTION

The invention is based on the finding that certain materials, when present during the anodization of valve metals, makes the resulting anodic film readily and reliably detachable from the underlying metal, and that the anodic film can then be transferred to another substrate by attaching the substrate to the anodic film and peeling the film from the underlying metal, or vice versa.

More particularly, the invention provides a process for coating a packaging film with a transparent moisture and oxygen barrier coating, which process comprises: providing a metal substrate made of a material selected from the group consisting of valve metals and anodizable valve metal alloys, at least at an exposed surface thereof; anodizing said metal substrate at said exposed surface to cause an anodic film of valve metal oxide to grow on said metal substrate, said anodization being carried out in the presence of an adhesion-reducing agent capable of making said anodic film readily detachable from said metal substrate; attaching said packaging film to said anodic film; and detaching said anodic film and attached packaging film from said metal substrate.

The invention also relates to coated packaging film produced by the process and apparatus for operating the process. By "packaging film", we mean a thin, flexible sheet of generally transparent or translucent material suitable for wrapping goods in order to protect them from contamination or damage.

DETAILED DESCRIPTION OF THE INVENTION AND THE PREFERRED EMBODIMENTS

Figure 1A:
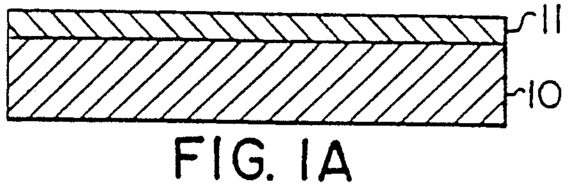
FIGS. 1(A)–(E) show cross-sections of intermediate and final products produced by a preferred process according to the invention.

In the present invention the anodic film is first formed on a metal substrate and is then transferred to a packaging film, in order to form a dense oxygen- and moisture-impermeable surface barrier coating on the packaging film. The packaging film can be made of any one of a variety of organic materials but is preferably an organic polymer and most desirably a transparent polymeric packing film suitable for use in the food packaging industry.

The anodic film is an oxide of a valve metal, e.g. Ta, Nb, Zr, Hf, Ti etc. and is most preferably tantalum oxide because Ta forms a particularly dense and flexible oxide which is especially suitable for the intended purpose (see S. F. Bubar and D. A. Vermilyea, J. Electrochem. Soc. 113 (1966) 892 and ibid 114 (1967) 882). The valve metals and their alloys form barrier oxide films when anodized in suitable electrolytes. Normally, the thickness of the anodic film depends on the voltage employed during the anodization step, with thicker films being formed at higher voltages. Anodic films which have effective barrier properties are usually those formed at voltages in the range of 30–300 V, although lower voltages may be employed if particularly thin (and consequently very flexible) films are required. The techniques of anodizing valve metals to form barrier oxide films are well known to persons skilled in the art, e.g. as described by L. Young in "Anodic Oxide Films" 1961, Academic Press, the disclosure of which is incorporated herein by reference. The anodization takes place very quickly and normally takes only seconds or minutes and the procedure is normally carried out at ambient temperature.

Since valve metals are usually quite expensive, the metal substrate is normally made up of a foil, sheet or plate of an inexpensive co-anodizable metal (e.g. aluminum) having a thin coating of the valve metal on one surface. The valve metal layer can be formed by any suitable technique, e.g. sputtering, evaporation, and need only be very thin, although the thickness should be great enough to avoid complete consumption of the metal during anodization. Generally, the layer thickness should be at least 250Å. As an example, a 300Åcoating of Ta can be deposited on an aluminum foil at speeds in the order of 50 feet per minute by a sputtering process. If desired, however, the metal substrate may be made entirely of the valve metal or alloy in the form of a foil, sheet, plate etc. This becomes economical if the valve metal is used repeatedly as a substrate for the film formation.

As noted above, anodization is carried out in the presence of an adhesion-reducing agent which has the effect of weakening the bond between the anodic film as it grows and the underlying valve metal. The most preferred adhesion-reducing agent is fluoride which may be in the form of a simple salt, e.g. NaF and KF, or in the form of complex salts, fluorine-containing compounds or acids, e.g. hydrofluoric acid or fluoroboric acid. The compound may be added to the electrolyte or coated on the surface of the valve metal prior to the anodization step. Generally, quite small amounts of the adhesion-reducing agent are required; for example, when the agent is fluoride, the amount can be as low as about 0.005% by volume (more preferably at least 0.05% by volume) of the electrolyte. However, the desired levels in any particular case can be determined by simple trial and experimentation.

Following the anodization step, after suitable rinsing to remove the electrolyte and suitable drying to remove residual moisture, the packaging film is attached to the outer surface of the anodic film. The attachment may be indirect, e.g. via a layer of an adhesive, glue etc., or direct when the nature of the substrate permits, e.g. polymers such as polyester and polypropylene may be directly heat sealed to the anodic film. The packaging film is normally in the form of a flat sheet, but shaped or contoured structures may be employed, provided the anodic film and metal substrate can be made to conform to the adhering surface of the packaging film or vice versa.

Once the packaging film has been attached to the anodic film, the anodic film is detached from the metal substrate. This is most easily achieved by peeling the anodic film gradually from the metal substrate or alternatively gradually peeling the metal substrate from the anodic film and packaging film, depending upon which is the more flexible. By making the metal substrate thin and flexible and the packaging film less flexible, the anodic film can be held flat by the desired substrate during the peeling step, which further helps to prevent any cracking or damage to the anodic films.

The accompanying drawings show various steps in a preferred form of the process and equipment which can be used to carry out the process.

Figure 1B:
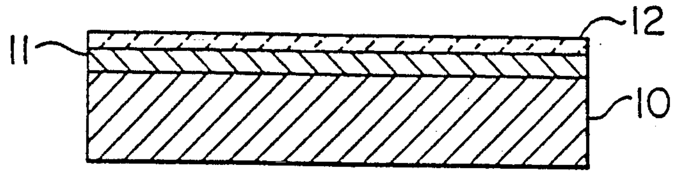
Figure 1C:
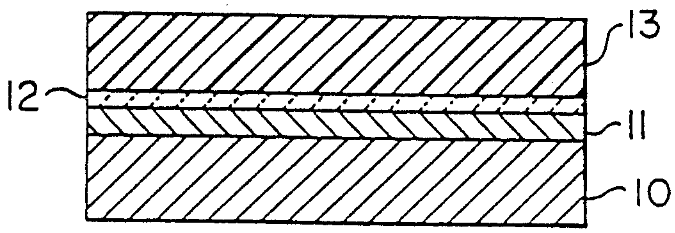
Figure 1D:
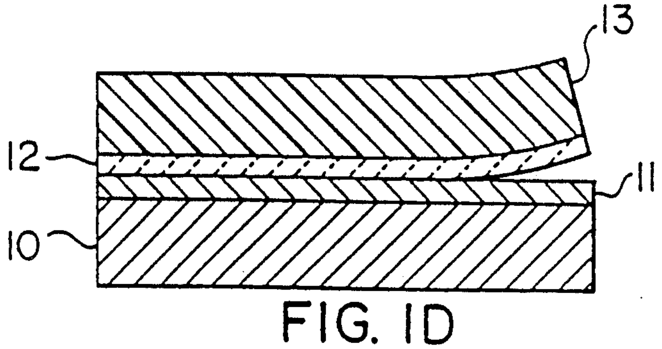
Figure 1E:
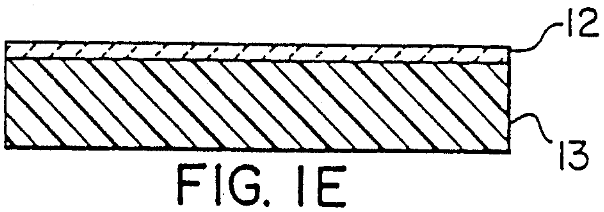

FIG. 1(A) shows a metal substrate comprising an aluminum foil 10 and a thin coating 11 of Ta. FIG. 1(B) shows the same structure following anodization of the Ta in an electrolyte containing an adhesion reducing agent, e.g. NaF. A detachable anodic film 12 is formed on the Ta surface. In FIG. 1(C), a packaging film 13, e.g. a thin plastic sheet, has been attached to the anodic film 12. In FIG. 1(D), the plastic sheet 13 and anodic film 12 are peeled from the metal substrate. FIG. 1(E) shows the plastic sheet 13, after inversion, having a surface coating 12 of dense anodic $Ta_2O_5$ acting as a moisture and oxygen barrier.

Figure 2:
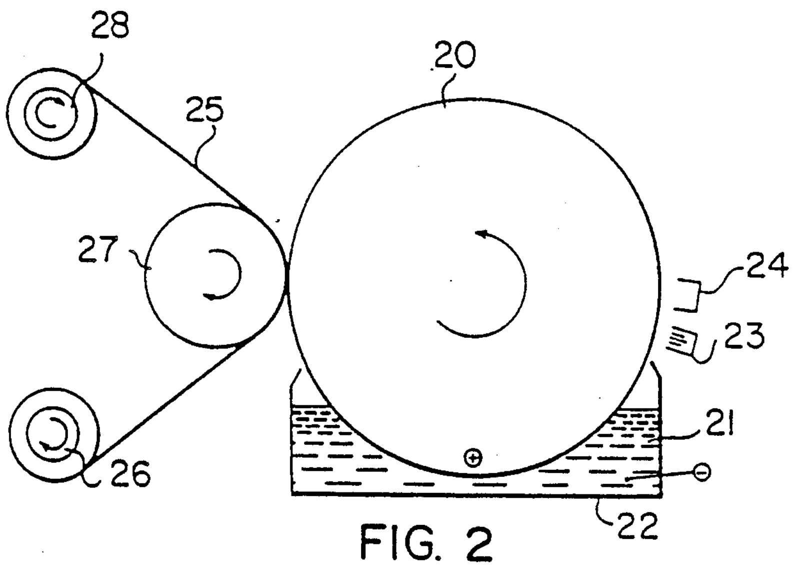
FIGS. 2 and 3 are schematic representations of apparatus for carrying out preferred processes according to the present invention on a continuous basis.

FIG. 2 shows apparatus for producing coated packaging film on a continuous basis. Drum 20 is made of, or has a surface coating of tantalum. The drum is rotated slowly in the direction of the arrow.

A bath 21 containing an electrolyte 22 (which includes an adhesion reducing agent, e.g. NaF) is positioned so that the lower section of the drum dips into the electrolyte and anodization of the Ta at the surface of the drum takes place. A washing station 23 washes the drum as it emerges from the bath and a drying station 24 dries it. A heat sealable polymer film 25, fed off a payoff roll 28, is pressed against the drum by heated transfer roller 27. The polymer film 25 adheres to the anodic film on the drum and the anodic film transfers from the drum to the polymer film. The coated polymer film is then wound onto take-up roll 26.

Figure 3:
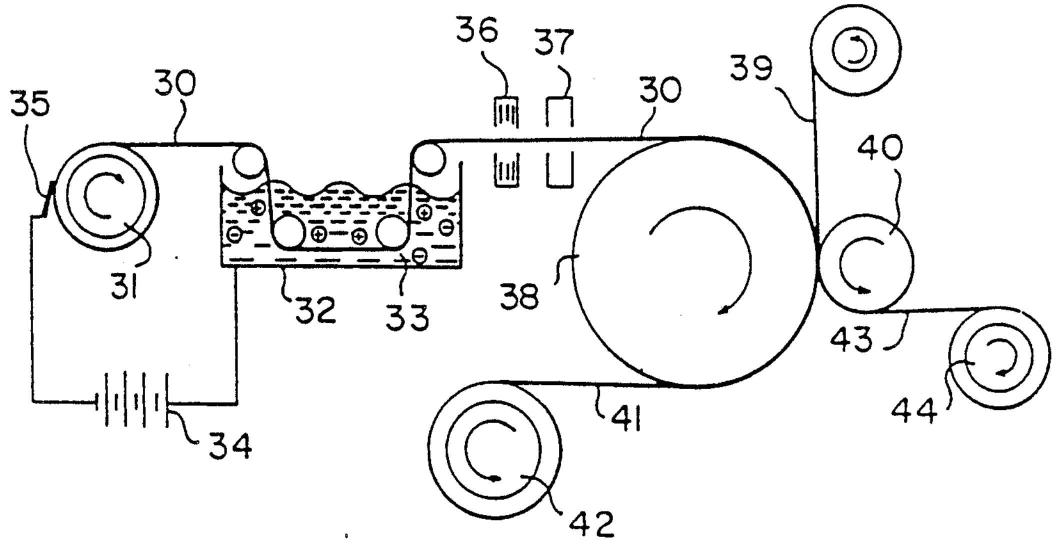

FIG. 3 shows alternative apparatus for producing a coated packaging film on a continuous basis. Foil 30, made of tantalum (e.g. 0.020 inch thick) or aluminum coated on one side with tantalum, is fed from pay-off roll 31 and is immersed by a series of rollers in an electrolysis tank 32 containing an electrolyte 33 suitable for anodization. Anodization of the foil takes place by virtue of the current flowing from battery 34 to the foil 30 (via sliding contact 35), through the electrolyte 33 and back to the battery via the tank 32. Following the anodization, the foil emerges from tank 32 and is rinsed at station 36 and dried at station 37. The foil then passes around a heated drum 38 where it contacts a heat sealable packaging film 39 under the pressure of a chill roll 40. In the nip between the drum 38 and roll 40 the anodic film formed on the tantalum surface of the foil 30 is stripped off the foil and transferred to the film 39. The stripped foil 41 is wound up on take-up roll 42 ready for re-use. The coated packaging film 43 is collected on take up roll 44.

The following Example illustrates the process of the invention.

EXAMPLE 1

Tantalum was sputtered onto aluminum foil in a commercial planar magnetron sputtering unit, at a power density of 5 watt/cm$^2$ and pressure of 10 mtorr to a thickness of 1,500Å. The coated foil was then anodized in 0.4 M phosphoric acid, doped with 0.05% hydrofluoric acid by volume, to a forming voltage of 90 V resulting in a Ta oxide anodic film thickness of 1500Å and leaving a residual layer of Ta metal 915Å thick. The anodized foil was then heat-sealed to polyethylene laminated polyester film, in a commercial heat seal apparatus, at a temperature of 150° C. The foil was then peeled away from the plastic film, transferring the Ta oxide layer to it as a coating.

The structures resulting from this process are illustrated in the cross-sectional transmission electron micrographs 4(A), (B) and (C) taken at magnifications of 80,000X, 60,000X and 13,000X respectively.

Figure 4A:
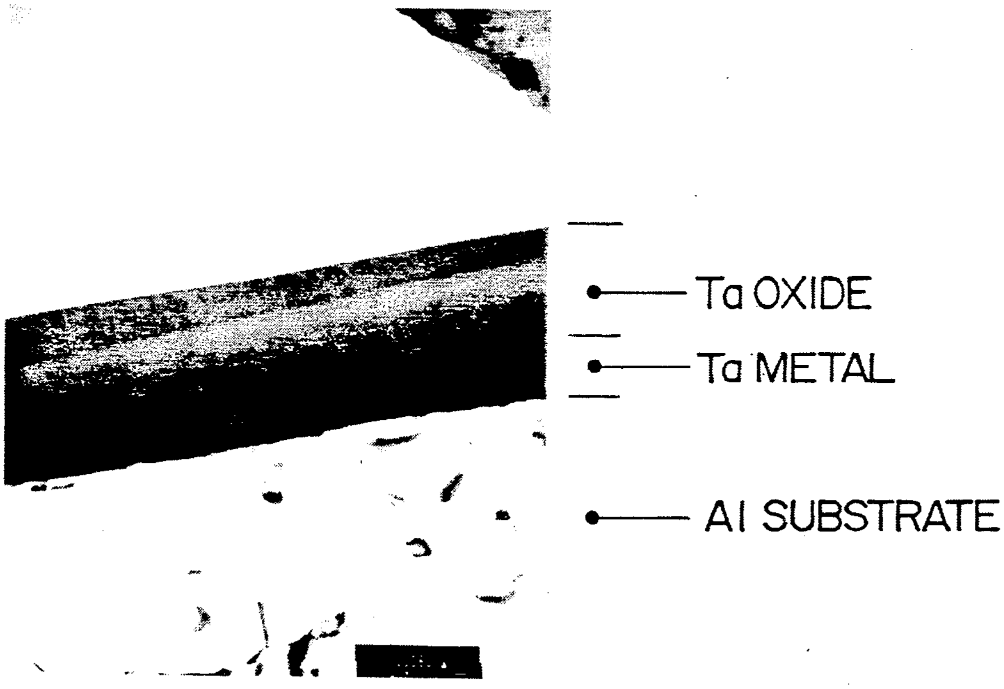
FIGS. 4(A)–(C) are photomicrographs of intermediates and the product formed in the Example.
Figure 4B:
Figure 4C:
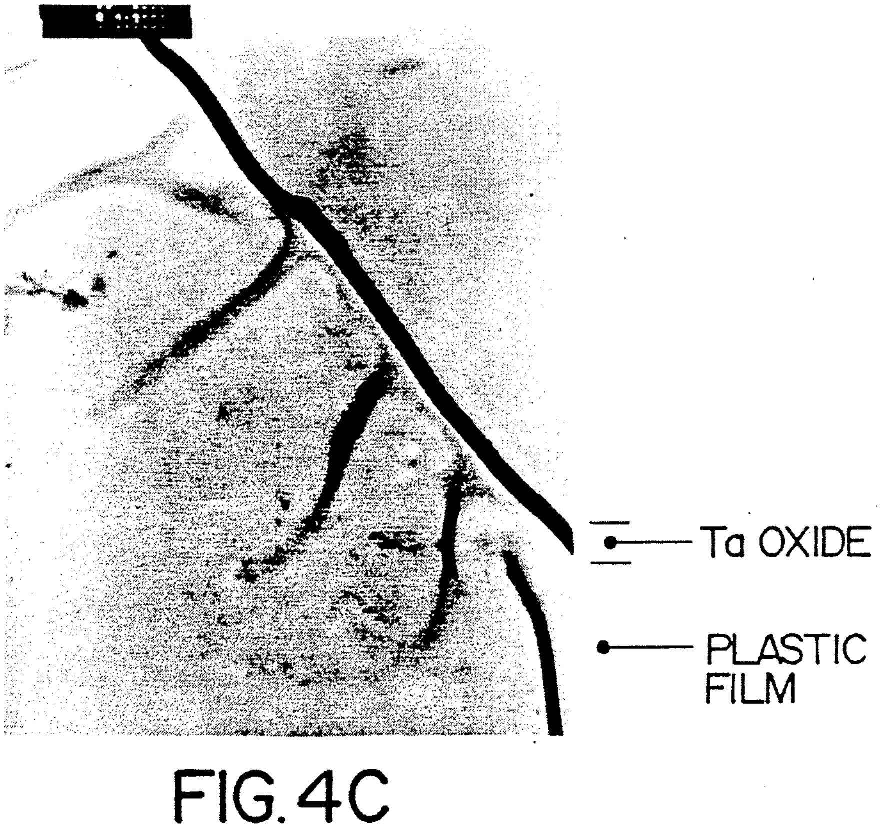

The intermediate and final structures are shown in FIGS. 4*a*, 4*b*, and 4*c*.

Micrograph 4*a* shows the as-anodized, Ta sputtered aluminum foil, which is slightly under-exposed to reveal the dense, homogeneous and amorphous Ta anodic film. At normal exposure, the layer would appear very dark due to the very large electron absorption of the dense oxide (as does the even denser Ta metal layer in the underexposed micrograph 4*a*).

Micrograph 4*b* shows the Ta oxide film transferred to the packaging film, which is slightly over-exposed to reveal the normally electron transparent organic substrate.

Micrograph 4*c* is a further magnification of micrograph 4*b* to illustrate the uniformity and crack or pore free nature of the transferred oxide over a larger area.

What we claim is:

1. A coated packaging film comprising a transparent layer of plastic having a coating thereon comprising an anodic film of a valve metal oxide, produced by a process which comprises:

providing a metal substrate made of a material selected from the group consisting of valve metals and anodizable valve metal alloys, at least at an exposed surface thereof;

anodizing said metal substrate at said exposed surface to cause an anodic film of valve metal oxide to grow on said metal substrate, said anodization being carried out in the presence of an adhesion-reducing agent capable of making said anodic film readily detachable from said metal substrate;

attaching a packaging film to said anodic film; and detaching said anodic film and attached packaging film from said metal substrate.

2. A coated packaging film according to claim 1, wherein said valve metal oxide is tantalum oxide.

* * * * *